United States Patent Office 3,280,040
Patented Oct. 18, 1966

3,280,040
METHOD FOR MAKING MULTI-COMPONENT CATALYSTS
Joseph Jaffe, Berkeley, Calif., assignor to Chevron Research Company, a corporation of Delaware
No Drawing. Filed May 22, 1964, Ser. No. 369,583
14 Claims. (Cl. 252—439)

This invention relates to a method for producing solid, coprecipitated mixtures containing at least one metal oxide and also having a minimum of three components, all of said components having been coprecipitated simultaneously.

As is well known to those skilled in the catalyst art, a gel, including both xerogels and aerogels, is produced by dehydration, generally by heating, of a hydrogel or gelatinous precipitate. A hydrogel can be defined as a rigid material containing both the continuous phase of a network of colloidal particles with the imbibed liquid phase. A gelatinous precipitate is similar to a hydrogel but without the characteristic of a rigid structure. It is also well known that metal oxide-containing gels have long been employed as catalysts and/or catalyst supports. Numerous methods of making such composites have been suggested, most of which have been directed to the particular components of the initial gel, the manner of forming the gel, and in various techniques for removing undesirable components from the formed gel.

One objective of the present invention is the production of coprecipitates containing at least one metal oxide and also containing a minimum of three components. Another objective is the production of such multi-component coprecipitated composites that contain at least one metal oxide that possesses catalytic isomerization activity, and at least one metal component whose metallic form, sulfide, or oxide has catalytic hydrogenation activity. Another objective is the production of specific catalysts for use in specific reactions, i.e., hydrocracking, hydrogenation, hydrodenitrification, and the like, that employ components imparting both isomerization and hydrogenating activity. Further objectives will be apparent from the disclosures herein.

The present invention is directed to a method for producing a coprecipitated solid containing at least one metal oxide and having a minimum of three components therein, said components having been coprecipitated simultaneously, which comprises the steps:

(a) Coprecipitating a mixture of at least three metal compounds at a pH of from about 5.5 to about 8, said mixture having all of the following characteristics, (1) said mixture being a solution or a sol,
(2) at least one of said metal compounds being a compound of a metal whose solid oxide possesses catalytic isomerization activity,
(3) at least one of said metal compounds being a compound of a metal which possesses catalytic hydrogenation activity when in the metal, the metal oxide or the metal sulfide state, and
(4) at least one of said metal compounds being a metal chloride.

(b) Reducing the chloride content of the resulting coprecipitate to below about 0.25 percent of the total weight thereof by washing and anion exchange, said anion exchange being conducted in the presence of acetate ion.

(c) Drying the resulting coprecipitate to produce said coprecipitated solid.

As indicated, the present method, requiring the simultaneous coprecipitation of the hydrogel composite, produces a gelatinous material containing at least three different precipitated metal compounds. This must be contrasted with the method of preparing a three-component solid composite as, for example, by cogelling only two metal compounds, dehydrating the two-component coprecipitate, and thereafter disposing a third metal component onto the coprecipitate by such conventional techniques as impregnation or sublimation. Although additional metal components can be impregnated upon the coprecipitate composite produced by dehydration of the hydrogel of the present process if desired, it is required that this initial coprecipitate be composed of at least three different metal compounds.

A major reason for the simultaneous coprecipitation is that it has been found that the catalysts produced in this manner are very much superior to three-component catalysts produced by such other methods as by dual impregnation of a single oxide support, or even those made by impregnating a third component on a coprecipitated two-component carrier. This marked superiority has been exemplified in the comparison of numerous catalysts. For example, three-component hydrocracking catalysts prepared according to the present method have been found to possess higher catalyst activities, lower fouling rates, and better selectivities than catalysts of similar composition prepared by other methods. The reasons for this superiority are not completely understood but it is believed that the reduction of trace contaminants, with perhaps a different and more favorable association of the catalytic functions than heretofore obtained, leads to these improved results.

In addition to the requirement that at least three different metal compounds be present in the initial mixture, a number of additional restrictions as to the character of these compounds must be met. These compounds must be such that when admixed together, the resulting mixture is in the form of a solution and/or a sol, so as to attain uniform dispersion throughout the mixture.

Further, the present method requires that at least one of the initial metal salts (that will subsequently be converted to the corresponding oxide by dehydration of the coprecipitate) be a compound of a metal whose solid oxide possesses catalytic isomerization activity. Such activity is almost universally dependent upon the particular metal oxide being acidic in character. Although a number of metal oxides, or mixtures thereof, possess this isomerization activity, alumina has been found to be particularly effective for use in the subject method. However, a considerable number of oxides, which, by themselves, do not possess isomerization activity, do so when combined. For example, silica alone does not, but when it is combined with alumina, magnesia, zirconia, titania, thoria, hafnia, or the like, the combination is highly active with respect to isomerization activity. For this reason, the desired isomerization activity can be attained by employing an aluminum salt in the initial mixture, or mixtures of metal salts of aluminum, magnesium, silicon, titanium, thorium, zirconium, hafnium, and such rare earths as cerium, samarium, and europium.

In addition to the inclusion of at least one salt of a metal whose oxide possesses catalytic isomerization activity, it is required that the initial mixture contain at least one metal salt from which the metal, metal sulfide, and/or metal oxide possessing hydrogenating (often referred to as hydrogenating-dehydrogenating and meaning the same thing) activity be included in the coprecipitate. As in the case of metal oxides having isomerization activity, many metals and their oxides and sulfides possess at least some hydrogenation activity. However, certain of these are superior in this respect and are, therefore, preferred. These preferred metals and oxides and sulfides are vanadium oxide, the Group VI metal oxides and sulfides of chromium, molybdenum, and tungsten, manganese oxide, rhenium metal, and, especially, the Group VIII metals, oxides and sulfides. Therefore, at least one salt of these latter Group VIII metals is preferably present in the starting materials that lead to the formation of the coprecipitate of the present invention.

The requirement that at least one of the metal components in the initial mixture be a metal chloride presents somewhat of an anomaly inasmuch as a subsequent step in the preparation involves the reduction of the chloride level below about 0.25 percent of the total weight of the final coprecipitate. This anomaly resides in the fact that I have found that chloride, in addition to certain other components such as sulfates and alkali metal compounds, have a deleterious effect upon the activity, regenerability, and/or the fouling rate of a number of catalysts. However, in view of the process advantages of using chloride salts due to their readiness to form solutions with other metal compounds, their commercial availability and relatively low price, it is often desirable to employ them. Thus, the present invention requires that at least one of the metal salts in the initial mixture be a chloride while also requiring that the chloride level of the final coprecipitate be reduced to below 0.25 percent by weight, and preferably, below about 0.1 percent by weight, of the final composite.

As noted above, it is often preferred that at least a portion of the initial mixture be in the form of a sol. For example, it is generally desirable to employ silica sols when silica is to be a component of the coprecipitate. In such a case the silica sol can be made by any conventional procedure. A number of methods for producing such a sol are known to those skilled in the art. Thus, silica sols can be made by hydrolizing tetraethyl orthosilicate with an aqueous HCl solution, or in the presence or absence of solvents, such as alcohols containing 1 to 4 carbon atoms per molecule, acetone, methylethyl ketone, and the like. Likewise, silica sols can be prepared by contacting silicon tetrachloride with a cold methanol and water solution, or with 95% ethyl alcohol, or with cold water or ice. Also, silica sols can be made by contacting sodium silicate with an ion exchange resin to remove the sodium, or by contact with an acid at a pH of about 2.5 or less. Likewise, if alumina is a desired component of the final coprecipitate, it is entirely feasible to employ alumina sols in the initial mixture. A sol of hydrous alumina can be prepared by reacting aluminum metal with dilute hydrochloric acid or with aluminum chloride solution, with or without a catalyst. Also, alumina sols can be prepared by reacting aluminum metal with a weak acid, such as formic or acetic acid.

As discussed above, at least one of the components of the initial mixture must be a metal chloride, and often it is desirable to incorporate at least one sol, such as a silica or alumina sol, in this mixture. Other metal salts can also be present. Suitable salts are the nitrates, citrates, formates, alcoxides and carbonates. Preferably, the acetates are employed. Sulfates are feasible but are often not desirable because of the adverse effect that sulfates have on some desirable catalyst qualities such as activity and/or fouling rate. If it is desired that silica be present, the silica component can also be derived from sodium silicate, tetra ortho ethyl silicate, silicon tetrachloride, and potassium silicate.

Following formation of the initial mixture, it is then coprecipitated, at a pH between about 5.5 and about 8, by conventional techniques. Thus, the initial mixture, if acidic, can be precipitated by the addition of a base. If the mixture is basic, it can be precipitated with an acid. The precipitation can be stepwise, as by a form of titration, or simultaneous, as by mixing of metered solutions in the proper ratios. It is apparent from the above discussion that any precipitating agent should preferably not introduce any components in the mixture that are deleterious, i.e., sulfate or excess alkali, although chloride can be introduced if necessary since the chloride content of the coprecipitate will be subsequently reduced by washing and anion exchange.

As an example of a conventional precipitation procedure employed in producing a silica-alumina-metal containing coprecipitate, sodium silicate can be dispersed into a solution of aluminum and metal chlorides containing an excess of acid, such as acetic acid, HCl, $HNO_3$ etc., to form a silica sol in the presence of dissolved metals. Ammonia can then be added to the mixture to coprecipitate the component hydrous oxides at a pH of from about 5.5 to 8. Precipitation of an acidic initial mixture with ammonia, as exemplified, is a preferred technique of the present method.

Following precipitation of the hydrous oxides, the excess liquid is removed, as by filtration. The resulting solid cake, still essentially composed of hydrous oxides, is then washed and ion exchanged to remove impurities and to reduce the chloride content to below the required level. Washing can be done in one or more steps, using water or dilute aqueous solutions of ammonium salts, preferably ammonium acetate. During or after washing and recovery of the filter cake, the latter is then required to be ion exchanged in the presence of acetate ion. The exact function of the acetate ion during the anion exchanging step is unknown, but, when compared to catalysts prepared by coprecipitation methods where there is no acetate ion present during the exchanging operation, there is no doubt that the presence of the acetate ion leads to catalysts having superior activities, regenerability and/or fouling rates. With catalysts containing certain components, as for example, nickel, molybdenum and tungsten, the presence of the acetate ion apparently provides a buffering action at a pH of 6 or 7 which minimizes the loss of soluble metals during washing and/or anion exchange of the coprecipitate. Whatever the reason, the present method requires that the anion exchange step be done in the presence of acetate ion. However, the acetate ion can be introduced into the procedure at any time up to, and including, the ion exchange step. Thus, the acetate ion can be introduced into the initial mixture, for example by acidifying with acetic acid or by employing soluble metal acetates, or in the washing liquid employed to wash the coprecipitate, or, for the first time, by employing ammonium acetate as the anion exchanger. Preferably, acetate ion is introduced into the initial mixture and also in the wash water as well as its use for ion exchange.

The treatment of the anhydrous oxides following precipitation (bearing in mind the requirement discussed above with respect to the presence of acetate ion) in order to prepare a solid composite suitable for use as a catalyst, follows practices known in the art insofar as the actual steps of washing, anion exchange and aging is concerned. In any case, the finally washed, ion exchanged and filtered cake of coprecipitate is then dried, as for example, in air or inert gases, to a temperature of from about 150 to 300° F. The coprecipitate is then calcined, generally at a temperature of from about 750° to 1100° F., in the presence of an oxygen containing gas. In catalysts wherein the hydrogenating component is at least one metal or compound of molybdenum tungsten, nickel or cobalt incorporated within a coprecipitate containing silica as a component, for example mixture with alumina, zirconia, and titania, it is preferred to thermactivate (heat treat) the calcined composite by contact with a dried gas at a temperature of from about 1100° to 1600° F. for a period in excess of about 0.25 hour.

The following examples will give some indication of the varying catalysts, and their superior qualities, that can be produced by the method of the present invention.

*Example 1*

Solution I was formed consisting of 570 gms. of $AlCl_3 \cdot 6H_2O$, 121.5 gms. of $NiCl_2 \cdot 6H_2O$, 88 gms. of acetic acid, and 2500 cc. of $H_2O$. Solution II was formed consisting of 482 gms. of commercial sodium silicate (29.6% $SiO_2$ and 9.2% $Na_2O$) and 2000 cc. of water. The two solutions were rapidly admixed and stirred to form a clear dispersion. The components were coprecipitated at a final pH of about 7 by slowly adding, accompanied by stirring, Solution III composed of 550 cc. of 15 M $NH_4OH$ in 2300 cc. of $H_2O$. The resulting slurry was then aged for 15 hours at a temperature of 75° F., the pH of the slurry being about 7 during the aging period. The slurry was then filtered and the cake recovered. The latter was then sequentially washed (7000 cc. each) and filtered in the following manner. Two washes with a 5% solution of ammonium acetate, three washes with a 1% solution of ammonium acetate, and a final wash with distilled water. All washes were conducted at a temperature of 75° F. and a pH of about 6.5. The slurry from the last wash (not filtered) was then hot aged at 250° F., calcined in a muffle furnace by contact with air at a temperature ranging from 900° to 1000° F. for 5 hours, and then thermactivated by contact with dried air at a temperature of 1400° F. for two hours. The resulting composite of metal oxides contained (in weight percent) 9.9 percent nickel (as the metal), about 40 percent alumina, about 47.5 percent silica, and had a chloride content of less than 0.01 percent. The catalyst had surface area of 294 m.²/gm. (square meters per gram) and a bulk density of 0.83 gm./cc. when crushed to 8–14 mesh particles.

The crushed composite (130 cc.) was then inserted into a reactor where it was heated to 520° F. in flowing hydrogen (2.2 cubic feet per hour) under a pressure of 1200 p.s.i.g. The nickel component was then substantially sulfided by passing a mixture of ethyl mercaptan in mixed hexanes (4.56 weight percent sulfur) at a rate of 0.55 LHSV (liquid hourly space velocity) into the flowing hydrogen. Injection of the sulfiding agent was continued for two hours at a temperature of 520° F. and then halted. The sulfided catalyst is herein termed Catalyst A.

After sulfiding the nickel component of the catalyst, the effectiveness of Catalyst A for hydro-cracking was tested. The test involved passing hydrogen and a test feed (once-through with no recycle) into the reactor and maintaining the conditions therein such that 60 volume percent of the feed was converted to products boiling from that of $C_5$ hydrocarbons to 400° F. With the particular test feed employed, the reaction conditions used were a feed rate of 1.5 LHSV, a total pressure of 1200 p.s.i.g., a starting temperature of 570° F., and a hydrogen rate of 5600 s.c.f. (standard cubic feet) of hydrogen per barrel of feed. The test feed was a hydrofined light catalytic cracking unit cycle oil boiling in the range of from 385° to 550° F., having a gravity of 30.5° API and a 98° F. aniline point. The feed contained 45.5% aromatics, 19.2% paraffins, 35.3% naphthenes, 0.5 p.p.m. (parts per million) nitrogen and less than 50 p.p.m. sulfur.

The run was continued for 710 hours at a constant 60% conversion, the conversion being kept constant by periodically increasing the reaction temperature to allow for loss of catalyst activity due to fouling of the catalyst.

The adjustments necessary to be made upon the reaction temperatures give rise to what is herein termed the fouling rate (FR) of the catalyst. It is apparent that the more rapid the rate that the reaction temperature must be increased to maintain the constant 60% conversion, the more rapid is the rate of undesirable catalyst fouling. It is desired to hydrocrack and/or hydrofine at the lowest possible temperature, since the advantages to on-stream catalyst life, before regeneration or replacement of the catalyst is necessary, are apparent and of decided benefit. The lower the fouling rate, the better the catalyst insofar as maintaining activity is concerned.

The fouling rate FR can be expressed in terms of temperature and time. Thus, in the above example, the FR was 0.03° per hour.

*Example 2*

This example is presented for comparative purposes only, to show the desirability of producing a catalyst in the presence of acetate ion and with a low final chloride level.

A solution of 370 gms. of $Al(NO_3)_3 \cdot 9H_2O$ in 2400 ccs. of water was rapidly admixed, with stirring, with a mixture of 224 gms. of commercial sodium silicate (containing 28.7% $SiO_2$ and 8.9% $Na_2O$) in 2000 ccs. of water. To the resulting mixture was slowly added a solution composed of 59.4 gms. of $Ni(NO_3)_2 \cdot 6H_2O$ and 194 cc. of 15 M $NH_4OH$ in 800 cc. of $H_2O$. Coprecipitation occurred after a portion of the latter solution had been added. The remainder was added to produce a slurry with a pH of about 7. The slurry was aged about 4 hours at 70° F. at a pH of about 7. The slurry was filtered, and the cake subjected to 8 washing and filtering steps conducted at about 75° F. The first three washes were done with a 5% solution of $NH_4Cl$, the next four with a 1% solution of $NH_4Cl$, and the last with distilled water. The final cake was then dried at 250° F. for 20 hours in air in a muffle furnace, was then calcined in air at 1000° F. for three hours, and then thermoactivated in dry air at 1400° F. for 2.5 hours.

The composite of metal oxides was analyzed and found to contain, in weight percent, 8.4% nickel (calculated as the metal) about 40% $Al_2O_3$, about 49.5% $SiO_2$, a chloride content of 0.11%, and a sodium content of 0.0015%. It had an area of 236 m.²/gm. and a bulk density of 0.80 gm./cc. when crushed to 8–14 mesh. This catalyst, after sulfiding, was termed Comparative Catalyst B.

The nickel component of the crushed composite was then reduced and sulfided and operated with the same test feed as described in Example 1. The reaction conditions employed in the test were identical to those used in Example 1, including a starting temperature of 570° F. to effect the same 60% conversion. Since the starting temperatures of both Catalysts A and B were the same, their catalyst activities, i.e., their ability to hydrocrack, were identical.

The test run was continued for 460 hours at a constant 60% conversion. At the end of this run, the temperature had been raised to 608° F. This shows that Comparative Catalyst B had an FR of 0.082° F./hr. or about 2.7 times as great as Catalyst A of Example 1, the latter being prepared according to the present method whereas the former was not. It is believed the presence of the acetate ion, during preparation, along with the much lower chloride level, is the reason for the displayed superiority of Catalyst A over Catalyst B.

*Example 3*

A commercial silica-alumina (about 87% of silica and 13% alumina) cracking catalyst was impregnated with a nickel nitrate solution such that, following drying, calcining, thermactivating and sulfiding in a manner similar to the operations described in Example 1, the catalyst (Comparative Catalyst C) had a nickel content (as the metal) of about 7 weight percent. This catalyst was tested in a manner similar to that described in Example 1, and had starting temperature of 570° F. at the same 60% conversion, but was found to have an FR of 0.12° F. per hour. Thus, although the catalyst activity was essentially the same as Catalyst A, the fouling rate of Comparative Catalyst C was four times that of Catalyst A. The reason for this is not completely understood but it is believed that the more intimate dispersion of the components with coprecipitated Catalyst A, as opposed to the impregnation technique of Catalyst C, leads to this fouling rate superiority.

*Example 4*

This example shows that Catalyst A, after a test run length of 710 hours, can be regenerated to very near its fresh activity and fouling rate.

Regeneration of Catalyst A was accomplished in situ by contacting the catalyst, on a once-through basis, with a heated oxygen-containing gas at a pressure of 100 p.s.i.g. The regenerating gas, at the onset, contained 0.3% oxygen and was completed with the gas containing 4% oxygen. The catalyst was gradually heated to a final temperature of 1000° F. The regenerated catalyst was then tested under the same conditions of pressure, space rate and hydrogen rate as in Example 1. The test feed was a hydrofined light catalytic cracking unit cycle oil, having a boiling range of from about 395° to 620° F., a gravity of 20° API, a 100° F. aniline point, and which contained 47% aromatics, 19% paraffins, 34% naphthenes, 0.3 p.p.m. nitrogen and 13 p.p.m. sulfur. In order to achieve the same 60 volume percent conversion as in Example 1, the starting reaction temperature was 582° F., very close to the 570° F. starting temperature employed when the catalyst was fresh. After a run length of 460 hours, the FR of regenerated Catalyst A was found to be 0.035° F. per hour, essentially the same as the fresh catalyst.

Comparative Catalyst C, regenerated and tested in a similar manner to Catalyst A, lost considerably more activity in that it required a starting temperature between 590° and 600° F. Regenerated Catalyst C had an FR of 0.12° F. per hour, the same as the fresh catalyst.

*Example 5*

This example graphically shows the adverse effect that the chloride-content of a hydrocracking catalyst has upon its fouling rate.

Three catalysts, Catalysts D, E and F, were all produced in an identical manner. Each preparation involved the following steps.

Solution I was composed of 426 gms. of $AlCl_3 \cdot 6H_2O$, 121.5 gms. of $NiCl_2 \cdot 6H_2O$, 136.2 gms. of zirconyl acetate solution $[H_2ZrO_2(C_2H_5O_2)_2$ having a 22% $ZrO_2$ content], 88 gms. of acetic acid, and 2500 cc. of water. Solution II was prepared and consisted of 482 gms. of sodium silicate solution (containing 28.7% SiO and 8.9% $Na_2O$) in 2000 cc. of $H_2O$. The two solutions were rapidly admixed and stirred. Solution III, consisting of 455 cc. of 15 M $NH_4OH$ in 3000 cc. of water, was slowly added to the mixture. A coprecipitate was formed and the resulting slurry (pH of 6.5) was then aged for 15 hours at 75° F. at the same pH. The slurry was then filtered and the cake recovered. The cake was then sequentially washed (7000 cc. each) and filtered in the following manner: two washes with a 5% solution of ammonium acetate, 4 washes with a 1% solution of ammonium acetate, and a final wash with distilled water. All washes were conducted at a temperature of 150° F. and a pH of about 6.5. The cake recovered from the last filtering step was then dried at 250° F. for 15 hours in a muffle furnace, calcined in moving air at 900° to 1000° F. from three to four hours, and then thermactivated in dry air at 1350° F. for two hours.

During the drying steps, all three catalysts were contacted with varying amounts of a chloride containing gas with the result that the chloride level on the three catalysts varied. The compositions of the three composites were as indicated in the table below.

TABLE

| Catalyst | D | E | F |
|---|---|---|---|
| Nickel (as the metal) wt. percent | 9.4 | 9.0 | 10 (Nom) |
| $Al_2O_3$, (Nom) wt. percent | 30 | 30 | 30 |
| $ZrO_2$ (Nom) wt. percent | 10 | 10 | 10 |
| $SiO_2$, (Nom) wt. percent | 48 | 48.5 | 47.5 |
| Chloride, wt. percent | 0.01 | 0.07 | 0.11 |
| Sodium, wt. percent | 0.009 | 0.0003 | 0.003 |
| Area, m.²/gm | 315 | 325 | 300 |
| Bulk density, gm./cc | 0.89 | 0.88 | 0.87 |

Catalysts D, E and F were then separately crushed, the nickel component reduced and sulfided as described in Example 1. Each catalyst was then tested with the hydrofined light cycle oil described in Example 4. The tests all involved 1.5 LHSV feed rates, total pressures of 1200 p.s.i.g., hydrogen rates of 5600 s.c.f./hr. and employed a recycle of the 400° F. plus bottoms. The hydrocracking activities of the three catalysts were almost identical as evidenced by the starting reaction temperatures of 567° F. (Catalyst D), 568° F. (Catalyst E), and 569° F. (Catalyst F). However, the catalyst fouling rates were quite different. Catalyst F, having a chloride level of 0.11 weight percent, had an FR of 0.085° F. per hour. Catalyst E, with a chloride level of 0.07 weight percent, had an FR of 0.036° F./hr. Catalyst D, with a chloride level of only 0.01 weight percent, had an FR of 0.019° F./hr. With all three catalysts having virtually identical compositions and prepared in almost identical manners, the adverse effect that chloride content has upon catalyst fouling rates is clearly shown. Thus, a reduction in chloride level from 0.11 to 0.01 weight percent allows a catalyst to operate about four times as long on stream before regeneration.

The effect of regeneration of Catalyst E was also demonstrated. Catalyst E was regenerated in the same manner as a Catalyst A described in Example 4 and was then tested with the same feed and under the same reaction conditions as employed with fresh Catalyst E. The catalyst activity was found to be only slightly less, since a 578° F. starting temperature was needed to attain the 60% conversion, and the fouling rate was only 0.045° F./hr., also only slightly above that of the fresh catalyst.

The effectiveness of Catalysts A, D, E and F leads to a preferred catalyst composition prepared according to the present invention, bearing in mind all of the preparation procedures described above. This preferred composition is one wherein the catalyst contains from about 5 to 25 weight percent of at least one Group VIII metal, oxide or sulfide, associated with silica-alumina or silica-alumina-zirconia. The silica content should lie in the range of from about 20 to 90 weight percent. If zirconia is present, it should be present in the range of from about 5 to 35 weight percent. Alumina makes up the remainder. More preferably, the Group VIII metal is nickel and should be present in the final catalyst as the sulfide.

*Example 6*

This example shows the advantages to be gained by reducing the chloride level of hydrodenitrification catalysts and employing acetate ion in their preparation.

Catalyst G was prepared by first forming a solution (Solution I) composed of 726 gms. of $AlCl_3 \cdot 6H_2O$, 109.5 gms. of $NiCl_2 \cdot 6H_2O$, 180 gms. of acetic acid and 4500 cc. of $H_2O$. Solution II was prepared and consisted of 910 cc. of 15 M $NH_4OH$, 146.5 gms. of $MoO_3$ ($MoO_3$ content calculated from a stock ammonium molybdate solution used) and 3140 cc. of water. Solution II was rapidly added, with stirring, to Solution I, thereby coprecipitating the components with a final pH of about 7. The resulting slurry was aged for 63 hours at a pH of 7 and a temperature of 75° F. The slurry was filtered and the cake recovered. The cake was then sequentially washed (7000 cc. per wash) and filtered in the following manner; two washes with a 5% solution of ammonium acetate, four washes with a 1% solution of ammonium acetate, and a final wash with distilled water. All washes were done at a temperature of 150° F. and at a pH of from 6.0 to 6.5. The cake recovered from the last filtering step was then dried, in a muffle furnace, for 15 hours at 250° F., and calcined in flowing air at a temperature of approximately 800° F. for four hours.

The resulting oxide composite was crushed to 8–14 mesh (130 cc.) and then heated with once-through hydrogen to 400° F., at a hydrogen rate of 6.3 cubic feet per hour, under a pressure of 800 p.s.i.g. The nickel and molybdenum components were then substantially converted to their corresponding sulfides by passing, at an LHSV of one, a 10% dimethyl disulfide in mixed hexanes

Example 9

Hydrocracking and hydrodenitrification Catalyst K was prepared in the following manner.

Solution I was prepared consisting of 699 gms. of $AlCl_3 \cdot 6H_2O$, 72.8 gms. of $NiCl_2 \cdot 6H_2O$, 174 gms. of acetic acid in 3500 cc. of water. Solution II was composed of 194 gms. of sodium silicate solution (containing 29.6% $SiO_2$ and 9.2% $Na_2O$) in 1000 cc. of water. The two solutions were rapidly admixed. Solution III, containing 800 cc. of 15 M $NH_4OH$, 90.5 gms. of $MoO_3$ ($MoO_3$ calculated from the stock ammonium molybdate solution used) and 3150 cc. of water, was slowly added, thereby coprecipitating the components. The final slurry had a pH of about 6 and was aged 15 hours at 75° F. The slurry was then filtered and the cake recovered. The latter was then sequentially washed (7000 cc. each) and filtered in the following manner; six washes with a 1% solution of ammonium acetate with a final wash with distilled water. All washes were done at a pH of 6 and a temperature of from 150° to 180° F. The cake recovered from the last filter step was hot aged for five hours at 270° F. in an autoclave, dried in a muffle furnace for 15 hours at 250° F., and calcined, in flowing air, for three hours at 800° F. and seven hours at 1000° F.

The resulting composite of metal oxides had a composition (in weight percent) of 6.1% nickel (as the metal), 15.2% molybdenum (as the metal), 50% alumina, 19.5% silica and less than 0.01% chloride. The surface area was 281 m.²/gm. and the bulk density was 0.90 gm./cc.

The composite was then crushed to 8–14 mesh and the nickel and molybdenum components substantially converted to their corresponding sulfides in the identical manner as was done to Catalyst A of Example 1.

The effectiveness of Catalyst K for hydrocracking a feedstock containing relatively large amounts of nitrogen-containing organic compounds without rapid fouling of the catalyst was then demonstrated. The test feed was a topped heavy Arabian gas oil having a boiling range of from 675° to 1015° F., a gravity of 24.9° API, a 176.5° F. aniline point, and which contained 2.3% sulfur and 553 p.p.m. nitrogen. The test feed, entering the reactor at an LHSV of 1.5, and hydrogen, at a rate of 5600 SCF per barrel of feed, contacted Catalyst K at a temperature of 762° F. and a total pressure of 1700 p.s.i.g. The reaction was conducted with the feed entering on a once-through basis, i.e., with no hydrocarbon recycle to the reaction. The conversion of the feed to synthetic products boiling below 650° F. amounted to, over the course of the on-stream period (303 hours), from 50 to 55 weight percent. The fouling rate of the catalyst was only 0.055° F. per hour, a very low FR in view of the high nitrogen and sulfur content of the test feed. It can be seen that Catalyst K was an excellent single-stage hydrocracking catalyst inasmuch as it had a high conversion rate and a low fouling rate.

Catalyst K also maintained the high activity and low FR after regeneration. Regeneration was done in situ by contacting the catalyst, on a once-through basis, with a heated oxygen-containing gas at a pressure of 100 p.s.i.g. The regenerating gas initially contained 0.5% oxygen and regeneration was completed with the gas containing 4% oxygen. The catalyst was gradually heated to a final temperature of 800° F. The regenerated Catalyst K was then tested with the identical test feed and with all reaction conditions exactly the same except the initial temperature (771° F.) as fresh Catalyst K. In this test, the conversion and the fouling rate of the catalyst was identical to that attained with the fresh catalyst. The loss of activity was very small, amounting to only 9° F., as shown by the initial reaction temperature of the fresh catalyst (762° F.) and the initial reaction temperature of the regenerated catalyst (771° F). Because of the effectiveness of Catalyst K, a preferred catalyst, made according to the present invention, will contain from about 3 to 12 weight percent of a Group VIII metal (in the form of the sulfide), about 7 to 30 weight percent of a Group VI metal (also in the form of the sulfide), from about 15 to 80 weight percent alumina, and at least 5 weight percent silica. More preferably, the Group VIII metal is nickel, and the Group VI metal is molybdenum or tungsten.

As has been described and exemplified above, the present catalyst preparation method is particularly suitable for producing hydrocracking and hydrofining, i.e., hydrodenitrification and hydrodesulfurization, catalysts. The specific conditions for conducting these various reactions are well known in the art. However, these reactions have many features in common and are herein generically termed "hydro-processing reactions." These reactions all are directed to the conversion of hydrocarbonaceous material and are conducted in the presence of added hydrogen since these reactions will all consume at least 250 SCF of hydrogen per barrel of feed contacted. The reaction temperatures will be in the range of from about 500° to 1000° F., preferably from about 500 to 900° F., and reaction pressures will be in the range of from about 200 to over 3000 p.s.i.g. and preferably, in the range of from about 300 to 2500 p.s.i.g., depending upon the particular feed employed. Feed rates will generally be in the range of from about 0.1 to 10.0 LHSV. Accordingly, catalysts prepared by the subject method are especially suited for in such hydro-processing reactions.

Although a number of catalysts made according to the present invention have been exemplified, it is apparent that variations could be made in the present method without departing from the spirit of the invention, and all such variations that fall within the scope of the appended claims are intended to be embraced thereby.

I claim:

1. A method for producing a coprecipitated solid containing at least one metal oxide and having a minimum of three components therein, said components having been precipitated simultaneously, which comprises the steps:
    (a) coprecipitating a mixture of at least three metal compounds at a pH of from about 5.5 to about 8, said mixture having all of the following characteristics,
        (i) said mixture being at least one member of the group consisting of solutions and sols,
        (ii) at least one of said metal compounds being a compound of a metal whose solid oxide possesses catalytic isomerization activity,
        (iii) at least one of said metal compounds being a compound of a metal which possesses catalytic hydrogenation activity when in the form selected from the group consisting of the metal, the metal oxide and the metal sulfide, and
        (iiii) at least one of said metal compounds being a metal chloride,
    (b) reducing the chloride content of the resulting coprecipitate to below about 0.25 percent of the total weight thereof by washing and anion exchange, said anion exchange being conducted in the presence of acetate ion, and
    (c) drying the resulting coprecipitate to produce said coprecipitated solid.

2. The method of claim 1 wherein in step (b), the chloride content of the coprecipitate is reduced to below about 0.1% of the total weight thereof.

3. The method of claim 1 wherein in step (b), the anion exchange is done with a solution of ammonium acetate.

4. The method of claim 1 wherein at least one of the metal compounds described in (a)(ii) is a compound of aluminum.

sulfiding agent into the now recycled hydrogen. The temperature was then raised to 570° F. and the hydrogen-sulfiding agent recycled for 10 hours, at a pressure of 800 p.s.i.g. and a temperature of 570° F.

The composition of Catalyst G was as follows, all quantities being in weight percent and the metal levels given as the metals. The catalyst contained 8.47% nickel, 25.0% molybdenum, 51.5% alumina, and 0.05% chloride. The catalyst had a surface area of 262 m.²/gm. and a bulk density of 0.99 gm./cc.

Comparative Catalyst H was prepared in the same manner as Catalyst G except for the following differences. Solution I did not contain any acetic acid and had 4000 cc. of water. Solution II contained 710 cc. of 15 M $NH_4OH$, with the same amount of $MoO_3$ in 3740 cc. of water. Aging of the slurry was done for 15 hours, with the pH and temperature the same. The recovered cake was sequentially washed (7000 cc. per wash) and filtered five times with distilled water only, i.e., with no acetate ion present. The washings were done at 200° F. and at a pH ranging from 7 to 5.2. The resulting oxide composite was then dried, calcined (4 hours) reduced and sulfided exactly as was done with Catalyst G.

The composition of Comparative Catalyst H was as follows, all amounts being in weight percent and the metal levels given as the metals. The catalyst contained 7.7% nickel, 26.9% molybdenum, 50% alumina, and 5.2% chloride. The catalyst had a surface area of 256 m.²/gm. and a bulk density of 1.05 gm./cc.

Both Catalysts G and H were then separately tested for denitrification activity, both tests employing the identical test feed under identical reaction conditions. The test feed was a topped California heavy straight-run gas oil having a boiling range of from 610° to 1000° F., a gravity of 16.2° API, a 152.7° aniline point and contained 0.97 percent sulfur and 5650 p.p.m. nitrogen .

Test reaction conditions were identical in both cases. The feed was passed (once-through) at an LHSV of 0.8 into the reaction zone, along with hydrogen entering at a rate of 4500 s.c.f./bbl. of feed, and contacted the catalyst at a temperature of 785° F. and a total pressure of 2000 p.s.i.g. The product from the reaction zone was then stripped of hydrogen, ammonia, $H_2S$, water and light gases and the resulting normally liquid product analyzed for nitrogen content so as to determine the degree of denitrification, the nitrogen content present in the form of organic nitrogen compounds. The product recovered from the reaction employing Comparative Catalyst H was 108 p.p.m. whereas it was only 32.5 p.p.m. in the product recovered from the denitrification reaction using Catalyst G. The marked superiority of the latter catalyst is believed attributable to the much lower chloride level therein (0.05%) as compared to that (5.2%) present in Catalyst H. Furthermore, Catalyst G was prepared in the presence of acetate ion whereas Comparative Catalyst H was not.

*Example 7*

Catalyst I was produced in essentially the same manner as Catalyst G of Example 6, the single difference being that there was 188.5 gms. of acetic acid present in Solution I rather than 180 gms. The composition of Catalyst I, after drying and calcining was as follows, the quantities again being given in weight percent and the metal components as the metals. The catalyst contained 7.44% nickel, 27.4% molybdenum, 49.5% alumina and less than 0.02% chloride. The surface area was 299 m.²/gm. and the bulk density 1.03 gms./cc. After reduction and sulfiding, the catalyst was tested for activity as follows. The test feed was a straight-run naphtha having a 200° to 400° F. boiling range, and which contained 30% olefins, 0.9% sulfur, and 300 p.p.m. nitrogen. The test feed, along with 3000 s.c.f. of hydrogen per barrel of feed, contacted Catalyst I, at an LHSV of 3, at an initial temperature of 620° F. and a total pressure of 370 p.s.i.g. The product from the reaction zone was then stripped of hydrogen (which was recycled to the reactor), $NH_3$, $H_2S$, water and light gases and the resulting normally liquid product, boiling in about the same range as the feed, was analyzed for nitrogen content and found to contain 0.3 p.p.m. The FR of Catalyst I was found to be 0.066° F./hr.

Comparative Catalyst J was prepared as follows. A commercial alumina catalyst was precalcined for one hour at a temperature from 900° to 1000° F., and then impregnated with a nickel nitrate solution containing 10% nickel and dried and calcined at 850° F. It was then impregnated with an ammonium molybdate solution (12% molybdenum metal) and dried and calcined at 850° F. It was then further impregnated with an ammonium molybdate solution (20% molybdenum metal) and given a final drying and calcining at 850° F.

Comparative Catalyst J was composed of about 6.4 weight percent nickel, 21 weight percent molybdenum (both the nickel and molybdenum compounds being in the form of their oxides but the percentages given as if in the metallic form), with the remainder alumina. Thus, Catalyst J had a composition very similar to Catalyst I but it had been prepared in a completely different manner.

Comparative Catalyst J was then sulfided in the same manner as was done to Catalyst I above and then tested to determine its activity relative to Catalyst I. This was done by passing the same test feed, under identical reaction conditions except for the temperature, into contact with Catalyst J. The reaction temperature was adjusted so that the same degree of denitrification occurred with Catalyst J as was accomplished with Catalyst I, namely, reducing the nitrogen in the feed from 300 p.p.m. to 0.3 p.p.m. in the normally liquid product recovered from the reaction zone. In order to achieve such a nitrogen removal with Comparative Catalyst J, it was necessary to use a reaction temperature of 670° F., or over 50° F. higher than that needed to attain the same nitrogen removal with Catalyst I. Based on extensive data, it has been found that this 50° F. difference in reaction temperature means that Catalyst I was 75% more active for hydrodenitrification than Comparative Catalyst J. Also, Catalyst J was found to have a fouling rate of 0.3° F./hr., about four and a half times that of the 0.066° F./hr. FR found with Catalyst I. Thus, it is apparent that the method of preparing a catalyst (Catalyst I) according to the present invention is quite superior to the simple impregnation technique employed in making Comparative Catalyst J.

*Example 8*

A fresh sample of Catalyst I was tested with a topped California crude light gas oil test feed that boiled in the range of from 550° to 850° F., had a gravity of 23.1° API, a 142.5° F. aniline point, and contained 0.7% sulfur and 2200 p.p.m. nitrogen. The test feed, along with 3500 s.c.f. of hydrogen per barrel of feed, was passed (once-through at an LHSV of 0.5) into contact with the catalyst at a temperature of 747° F. and a total pressure of 1600 p.s.i.g. The normally liquid product had a nitrogen content of only 0.3 p.p.m. and Catalyst I had a fouling rate, with this test feed, of only 0.014° F. per hour.

Catalyst I was then regenerated in situ by contacting the catalyst, on a once-through basis, with a heated oxygen-containing gas at a pressure of 100 p.s.i.g. The regenerating gas contained 0.5% oxygen. Regeneration was completed after the regenerating gas had heated the catalyst to 850° F.

Regenerated Catalyst I was then tested with the same test feed (described in this example above) and under the same reaction conditions except that the temperature was 734° F. instead of 737° F. The results showed that the regenerated catalyst attained the identical nitrogen removal as the fresh catalyst and had an FR of only 0.017° F. per hour. Thus, regeneration of Catalyst I did not appreciably affect either its activity or fouling rate.

5. The method of claim 1 wherein at least one of the metal compounds described in (a)(iii) is a compound of a Group VIII metal.

6. A method for producing a coprecipitated solid containing alumina, at least one Group VIII metal component, and at least one other component, all of the components having been precipitated simultaneously, which comprises the steps:
 (a) coprecipitating a mixture of at least three metal compounds at a pH of from about 5.5 to about 8, said mixture having all of the following characteristics,
   (i) said mixture being at least one member of the group consisting of solutions and sols,
   (ii) one of said metal compounds in said mixture being an aluminum compound,
   (iii) one of said metal compounds in said mixture being a compound of a Group VIII metal,
   (iiii) at least one of said metal compounds being a metal chloride,
 (b) reducing the chloride content of the resulting coprecipitate to below about 0.25 percent of the total weight thereof by washing and anion exchange, said anion exchange being conducted in the presence of acetate ion, and
 (c) drying and calcining the resulting coprecipitate to produce said coprecipitated solid.

7. The method of claim 6 wherein in step (b), the chloride content of the coprecipitate is reduced to below about 0.1% of the total weight thereof.

8. The method of claim 6 wherein in step (b), the anion exchange is done with a solution of ammonium acetate.

9. The method of claim 6 wherein, following step (c), the Group VIII metal component of the coprecipitated solid is substantially converted to its sulfide.

10. The method of claim 6 wherein the Group VIII metal compound described in step (a)(iii) is a compound of nickel.

11. The method of claim 6 wherein one of the metal compounds in the mixture of step (a) is a compound of silicon.

12. The method of claim 6 wherein one of the metal compounds in the mixture of step (a) is a compound of molybdenum.

13. The method of claim 6 wherein one of the metal compounds in the mixture of step (a) is a compound of tungsten.

14. The method of claim 6 wherein the mixture of step (a) contains, in addition to said aluminum compound, compounds of nickel, silicon and zirconium.

References Cited by the Examiner
UNITED STATES PATENTS

| | | | |
|---|---|---|---|
| 3,008,895 | 11/1961 | Hansford et al. | 208—112 |
| 3,159,569 | 12/1964 | Hansford | 208—110 |
| 3,222,273 | 12/1965 | Flinn et al. | 208—112 |

DELBERT E. GANTZ, *Primary Examiner.*

A. RIMENS, *Assistant Examiner.*